(12) United States Patent
Deng (10) Patent No.: US 9,385,519 B2
(45) Date of Patent: Jul. 5, 2016

(54) CORD WINDER

(71) Applicant: Primax Electronics Ltd., Neihu, Taipei (TW)

(72) Inventor: Xiang-Hui Deng, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 341 days.

(21) Appl. No.: 13/921,001

(22) Filed: Jun. 18, 2013

(65) Prior Publication Data

US 2014/0326818 A1 Nov. 6, 2014

(30) Foreign Application Priority Data

May 2, 2013 (CN) ...................... 2013 2 0233739 U (51) Int. Cl.
*B65H 75/44* (2006.01)
*H02G 11/02* (2006.01)

(52) U.S. Cl.
CPC ........... *H02G 11/02* (2013.01); *B65H 75/4431* (2013.01); *B65H 75/4434* (2013.01)

(58) Field of Classification Search
CPC .............. H02G 11/02; B65H 75/4418; B65H 75/4421; B65H 75/4423; B65H 75/4426; B65H 75/4428; B65H 75/4431; B65H 75/4434
USPC .............. 242/378, 378.1, 378.2, 378.3, 378.4
See application file for complete search history.

(56) References Cited

U.S. PATENT DOCUMENTS

| | | | | |
|---|---|---|---|---|
| 3,061,234 A * | 10/1962 | Morey | ........................ | 242/378.2 |
| 6,866,218 B2 * | 3/2005 | Liao | ............................. | 242/378.1 |
| 7,455,255 B1 * | 11/2008 | Chao | ............................ | 242/378.1 |
| 7,604,194 B2 * | 10/2009 | Chang | .................... | B65H 75/28 |
| | | | | 242/378.1 |
| 2004/0200919 A1 * | 10/2004 | Burke | ................ | B65H 75/4434 |
| | | | | 242/378.1 |
| 2007/0026727 A1 * | 2/2007 | Lo | ................................ | 439/502 |

* cited by examiner

*Primary Examiner* — Sang Kim
*Assistant Examiner* — Nathaniel Adams
(74) *Attorney, Agent, or Firm* — Kirton McConkie; Evan R. Witt (57) ABSTRACT

A cord winder includes a base, a rotating disc, a spiral spring, a cord, a cord positioning element, a push button, and a top cover. When a first end part of the cord is pulled, the rotating disc and the cord positioning element are rotated in a first direction, and two protruding blocks of the push button are moved along an inner surface of the cord positioning element. When the first end part of the cord is no longer pulled, the two protruding blocks are respectively contacted with two notches of the inner surface of the cord positioning element. Consequently, the rotating disc and the cord positioning element are not rotated. When the push button is pressed down, the rotating disc and the cord positioning element are rotated in a second direction in response to a restoring force of the spiral spring. Consequently, the cord is retracted back.

8 Claims, 11 Drawing Sheets

CORD WINDER

FIELD OF THE INVENTION

The present invention relates to a cord winder, and more particularly to a single-pull cord winder.

BACKGROUND OF THE INVENTION

Generally, communication devices, electronic devices and their peripheral devices (e.g. phones, routers, mouse devices, keyboards and chargers) use cords as mediators of power supply or data transmission. For complying different occasions, each cord has a specified length. For example, if the computer host is far away from the desk surface, a longer cord is employed to achieve the normal operation of the mouse device. Since the length of the cord of each product is fixed, some drawbacks may occur. For example, too long cord may cause messiness of the user's working platform. During the process of storing and carrying the product, the long cord is easily entangled. Moreover, it is difficult to operate the product with the short cord. In other words, the long cord and the short cord are both inconvenient to the user.

Figure 1:
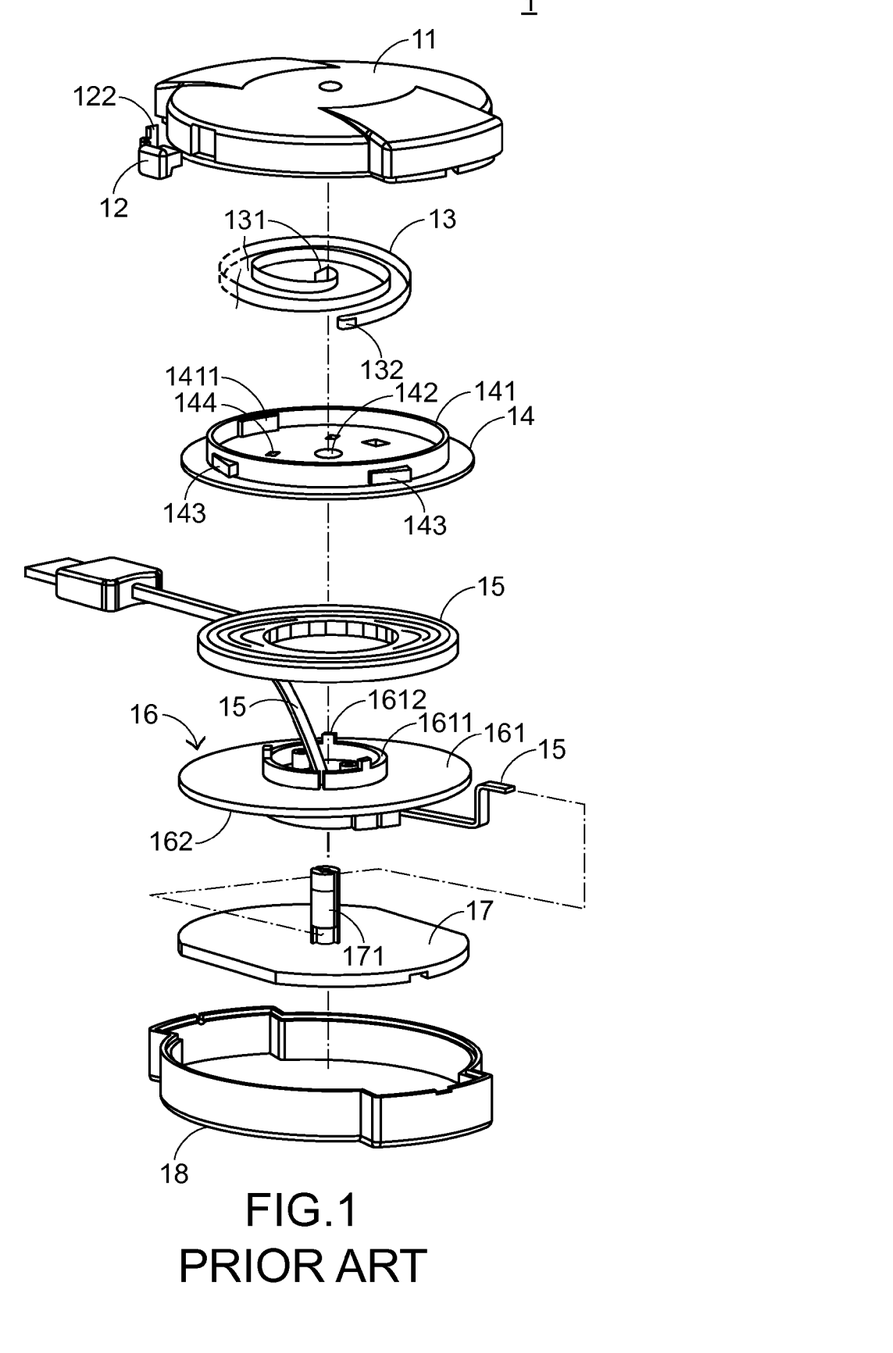
FIG. 1 is a schematic exploded view illustrating a conventional cord winder.

For overcoming the above problems, a variety of cord winders have been introduced into the market. The cord winder is used for receiving a portion of a cord therein. According to the practical requirements, the exposed length of the cord outside the cord winder can be adjusted by the user as required. Hereinafter, a conventional cord winder will be illustrated with reference to FIG. 1. FIG. 1 is a schematic exploded view illustrating a conventional cord winder.

First of all, the components of the cord winder 1 will be illustrated as follows. As shown in FIG. 1, the cord winder 1 comprises a top cover 11, a push button 12, a spiral spring 13, a rotating disc 14, a cord 15, a winding reel 16, a bottom disc 17, and a bottom cover 18. The push button 12 comprises a sustaining rod 122. The spiral spring 13 comprises an inner end 131 and a hook part 132. The rotating disc 14 comprises an edge seat 141, a clamping sheet 1411, a central hole 142, a positioning block 143, and an engaging hole 144. The winding reel 16 comprises an upside part 161, a winding seat 1611, an engaging buckle 1612, and a downside part 162. The bottom disc 17 comprises a central axel 171.

A process of assembling the cord winder 1 will be illustrated as follows. Firstly, the spiral spring 13 is disposed within the edge seat 141 of the rotating disc 14. Then, the central axel 171 of the bottom disc 17 is penetrated through the central hole 142 of the rotating disc 14, and the inner end 131 of the spiral spring 13 is fixedly connected with the central axel 171 of the bottom disc 17. In addition, the hook part 132 at an outer end of the spiral spring 13 is engaged with the clamping sheet 1411 of the edge seat 141.

Then, the engaging buckle 1612 of the winding seat 1611 on the upside part 161 of the winding reel 16 and the corresponding engaging hole 144 of the rotating disc 14 are engaged with each other. After the cord 15 is wound around the outer surface of the winding seat 1611, the cord 15 is penetrated through the winding reel 16 to the downside part 162 and wound around the downside part 162. Then, the cord 15 is penetrated through the bottom disc 17, and fixed on the bottom disc 17. Meanwhile, since an end of the cord 15 can be freely pulled and the other end of the cord 15 is in a fixed status, the single pull function is achieved.

Afterwards, the push button 12 is pivotally coupled to an outer side of the top cover 11. The push button 12 can be restored to its original position after the push button 12 is pressed down. Moreover, the position of the sustaining rod 122 of the push button 12 corresponds to the position of the positioning block 143 of the rotating disc 14.

Hereinafter, the operating principles of the cord winder 1 will be illustrated in more details. When an end of the cord 15 is pulled by the user, the rotating disc 14, the winding reel 16 and the cord 15 wound around the upside part 161 are synchronously rotated. Meanwhile, the sustaining rod 122 of the push button 12 is slid along the positioning block 143 of the rotating disc 14, so that the sustaining rod 122 of the push button 12 is not positioned. As the rotating disc 14 and the winding reel 16 are rotated, the spiral spring 13 is gradually in a tightened status.

Until the cord 15 is pulled to expose the desired length and the cord 15 is no longer pulled, the rotating disc 14 is reversely rotated in response to the restoring force of the spiral spring 13. Under this circumstance, the sustaining rod 122 of the push button 12 is contacted with the positioning block 143 of the rotating disc 14, and thus the sustaining rod 122 of the push button 12 is positioned.

For retracting the pulled cord 15 back to the inner space of the cord winder 1, the user may press down the push button 12 to have the sustaining rod 122 detach from the positioning block 143. Consequently, the rotating disc 14 and the winding reel 16 are continuously rotated in the reverse direction to retract the cord 15 back. As the cord 15 is retracted back, the spiral spring 13 is gradually in a loosened status.

From the above discussions about the conventional cord winder 1, the cord 15 is retracted back by pressing down the push button 12 and the positioning function is achieved by the sustaining rod 122. However, the conventional cord winder 1 still has some drawbacks. For example, since the push button 12 of the cord winder 1 is located at a lateral side of the top cover 11, the size of the push button 12 is restricted by the thickness of the top cover 11. If the size of the push button 12 is too small, it is difficult to manipulate the push button 12. Whereas, if the thickness of the top cover 11 is changed to comply with the size of the push button 12, after the size of the push button 12 is adjusted to an optimized size, the thickness of the top cover 11 is usually too thick.

Moreover, the sustaining rod 122 of the push button 12 is contacted with the positioning block 143 of the rotating disc 14 to achieve the positioning function. Due to the limitation of the size of the push button 12, the sustaining rod 122 is usually weak and thin. Under this circumstance, the use life of the cord winder 1 is adversely affected.

For overcoming the above drawbacks of the conventional cord winder, there is a need of providing an improved cord winder.

SUMMARY OF THE INVENTION

The present invention provides a single-pull cord winder that is easily operated.

In accordance with an aspect of the present invention, there is provided a cord winder. The cord winder includes a base, a rotating disc, a spiral spring, a cord, a cord positioning element, a push button, a position-restoring element, and a top cover. The base includes a protruding post. The rotating disc is disposed on the base. The protruding post is penetrated through the rotating disc. The spiral spring is disposed on the rotating disc, and wound around the protruding post. An inner end of the spiral spring is fixed on the protruding post, and an outer end of the spiral spring is fixed on the rotating disc. The cord is penetrated through the rotating disc, and wound on a first surface and a second surface of the rotating disc. A first end part of the cord is exposed outside the base, and a second end part of the cord is fixed on the base and exposed outside the base. The cord positioning element is connected with the rotating disc. Two notches are formed in an inner surface of the cord positioning element. The push button includes a pressing part and two protruding blocks. The two protruding blocks are in contact with the inner surface of the cord positioning element for limiting rotation of the cord positioning element. The position-restoring element is arranged between the push button and the base for providing a restoring force to the push button. The top cover is connected with the base, and includes a hollow portion. The hollow portion is formed in a top surface of the top cover. The pressing part of the push button is inserted into the hollow portion. Moreover, the push button is not rotated relative to the top cover. When the first end part of the cord is pulled away from the base, the rotating disc and the cord positioning element are rotated in a first direction, and the two protruding blocks of the push button are moved along the inner surface of the cord positioning element. When the first end part of the cord is no longer pulled, the two protruding blocks are respectively contacted with the two notches, so that the rotating disc and the cord positioning element are not rotated. When the push button is pressed down, the two protruding blocks are separated from the inner surface of the cord positioning element, and the rotating disc and the cord positioning element are rotated in a second direction by the spiral spring, so that the cord is retracted back.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 2:
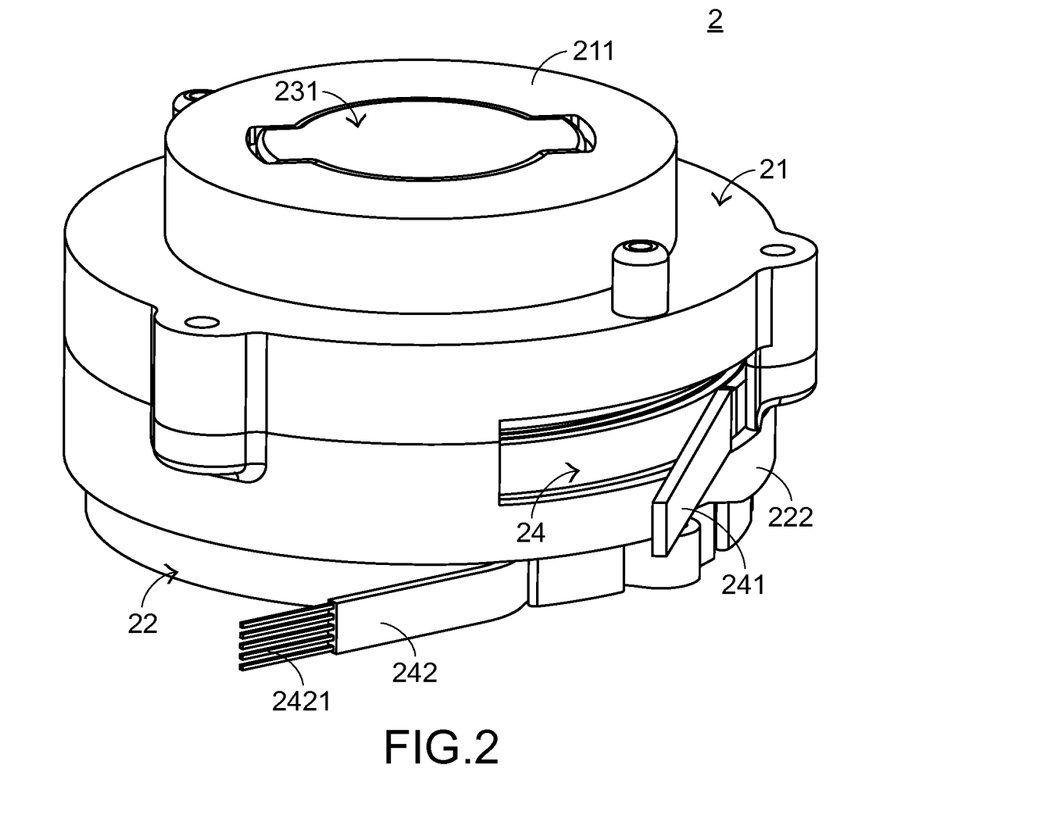
FIG. 2 is a schematic perspective view illustrating the outer appearance of a cord winder according to an embodiment of the present invention.

FIG. 2 is a schematic perspective view illustrating the outer appearance of a cord winder according to an embodiment of the present invention. As shown in FIG. 2, a top cover 21 and a base 22 are collaboratively assembled as an outer casing of the cord winder 2. A pressing part 231 of a push button 23 (see also FIG. 3) is exposed outside a top surface 211 of the top cover 21. A first end part 241 and a second end part 242 of a cord 24 are protruded from a sidewall 222 of the base 22 and exposed outside. In addition, the second end part 242 of the cord 24 is fixed on the base 22. In this embodiment, the second end part 242 of the cord 24 is fixed on the sidewall 222 of the base 22, but is not limited thereto. The way of fixing the second end part 242 of the cord 24 is not restricted.

Optionally, the first end part 241 of the cord 24 is further equipped with an electrical connector (not shown). An example of the electrical connector includes but is not limited to a USB plug, a RJ45 plug, a RJ11 plug, a D-SUB plug, a DVI plug or a HDMI plug. Moreover, the second end part 242 of the cord 24 is equipped with plural contacts 2421. After the plural contacts 2421 is connected with a circuit board (not shown), the cord 24 can be used to transfer electric power or transmit data.

For example, in case that the plural contacts 2421 at the second end part 242 of the cord 24 is electrically connected with the circuit board of a mouse and the electrical connector at the first end part 241 of the cord 24 is connected with a computer (not shown), the cord 24 can be used as a mediator of power supply or data transmission between the mouse and the computer.

Moreover, the cord winder 2 may be disposed within a communication device, an electronic device and a peripheral device thereof. Alternatively, the cord winder 2 may be disposed outside a communication device, an electronic device and a peripheral device thereof As the first end part 241 of the cord 24 of the cord winder 2 is pulled away from the base 22, the exposed length of the cord 24 outside the base 22 is gradually increased. When the first end part 241 of the cord 24 is no longer pulled, the exposed length of the cord 24 outside the base 22 is fixed. When the pressing part 231 of a push button 23 is pressed toward the inner part of the cord winder 2, the cord 24 will be automatically retracted back to the cord winder 2. Consequently, the exposed length of the cord 24 may be adjusted by the user according to the practical requirements. Hereinafter, the way to achieve the above functions of the cord winder 2 will be illustrated in more details.

Figure 3:
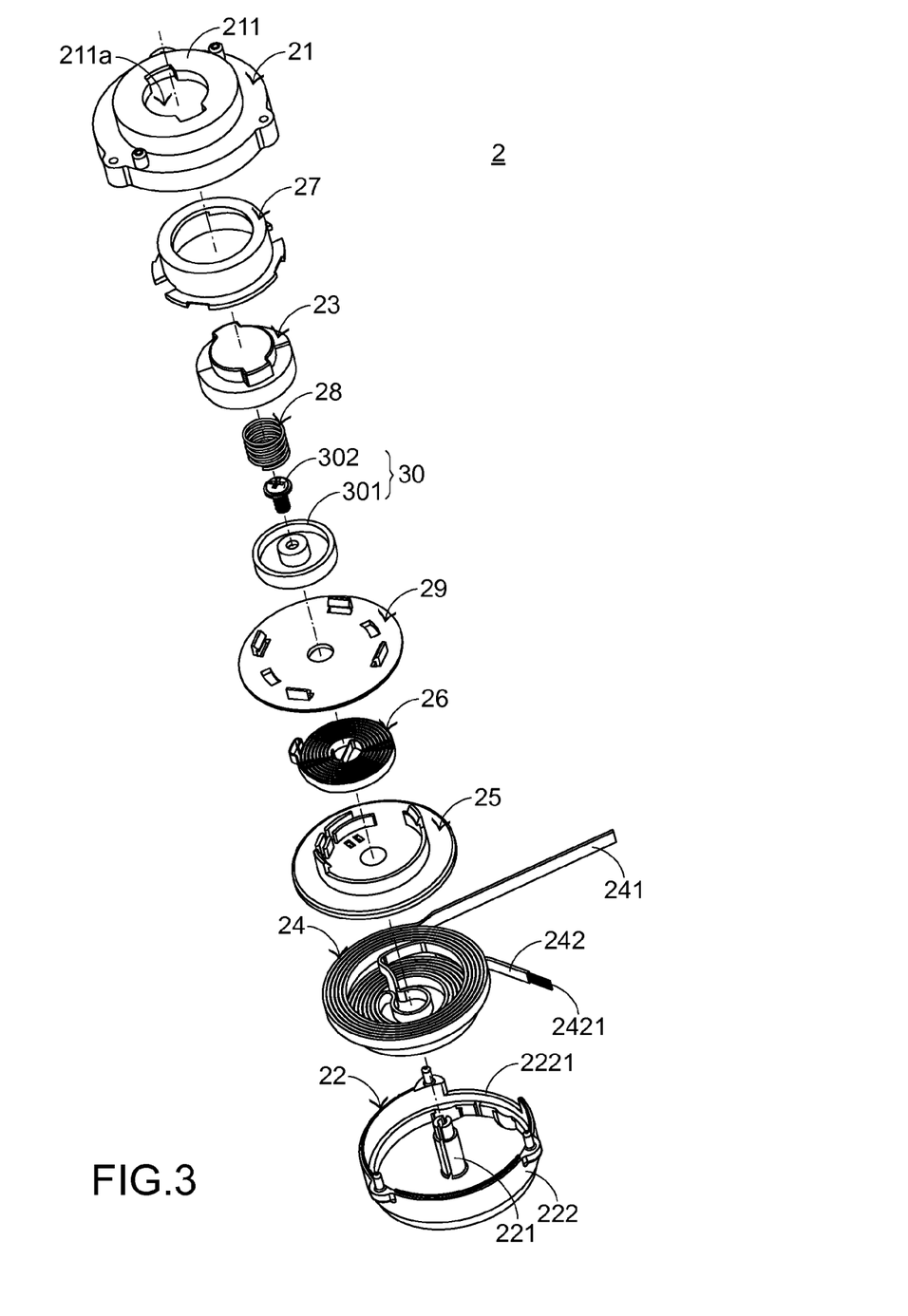
FIG. 3 is a schematic exploded view illustrating the cord winder according to the embodiment of the present invention.

First of all, the components of the cord winder 2 of the present invention will be illustrated with reference to FIG. 3. FIG. 3 is a schematic exploded view illustrating the cord winder according to the embodiment of the present invention. As shown in FIG. 3, the cord winder 2 comprises the top cover 21, the base 22, the push button 23, the cord 24, a rotating disc 25, a spiral spring 26, a cord positioning element 27, a position-restoring element 28, a covering plate 29, and a position-limiting mechanism 30.

Figure 4:
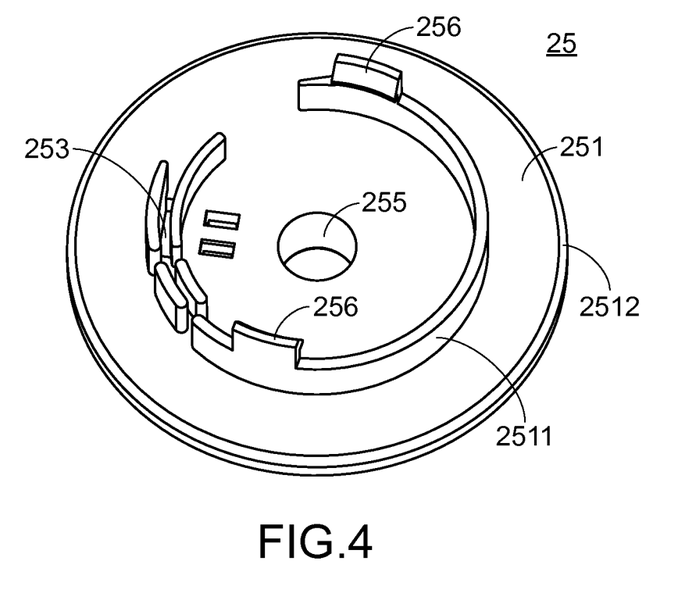
FIG. 4 is a schematic perspective view illustrating the rotating disc of the cord winder according to the embodiment of the present invention.
Figure 5:
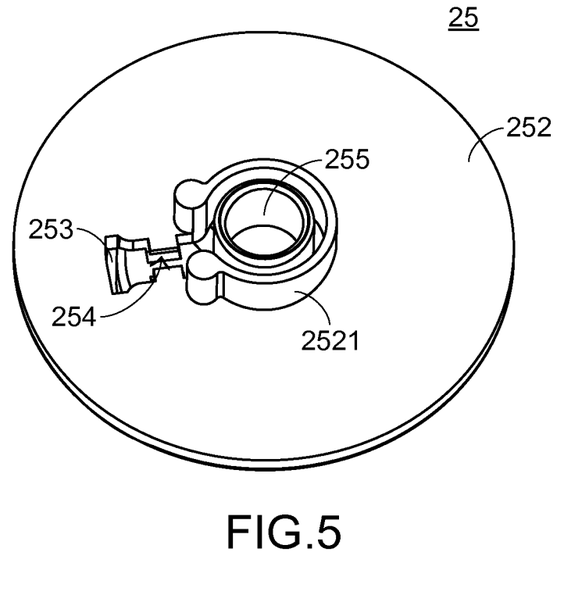
FIG. 5 is a schematic perspective view illustrating the rotating disc of FIG. 4 and taken along another viewpoint.
Figure 6:
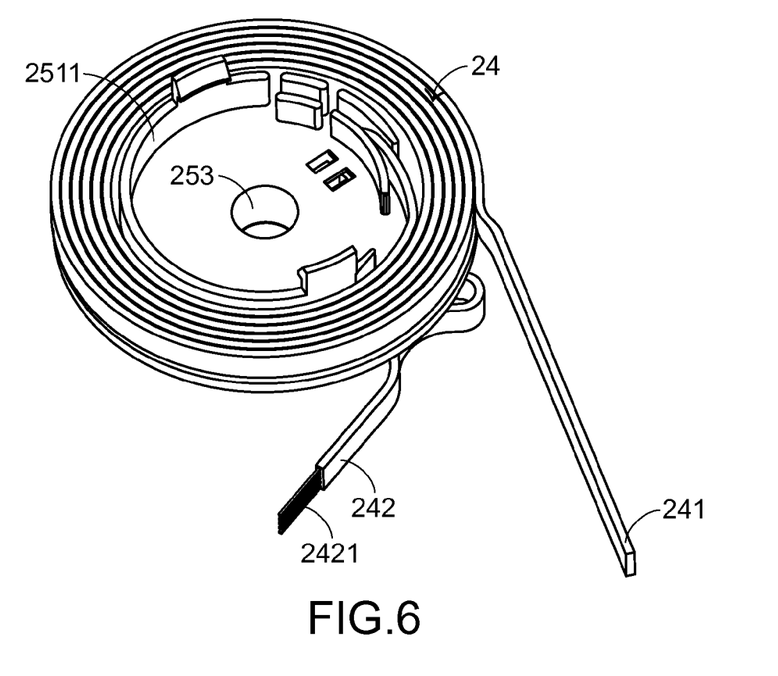
FIG. 6 is a schematic perspective view illustrating the combination of the rotating disc and the cord of the cord winder according to the embodiment of the present invention.
Figure 7:
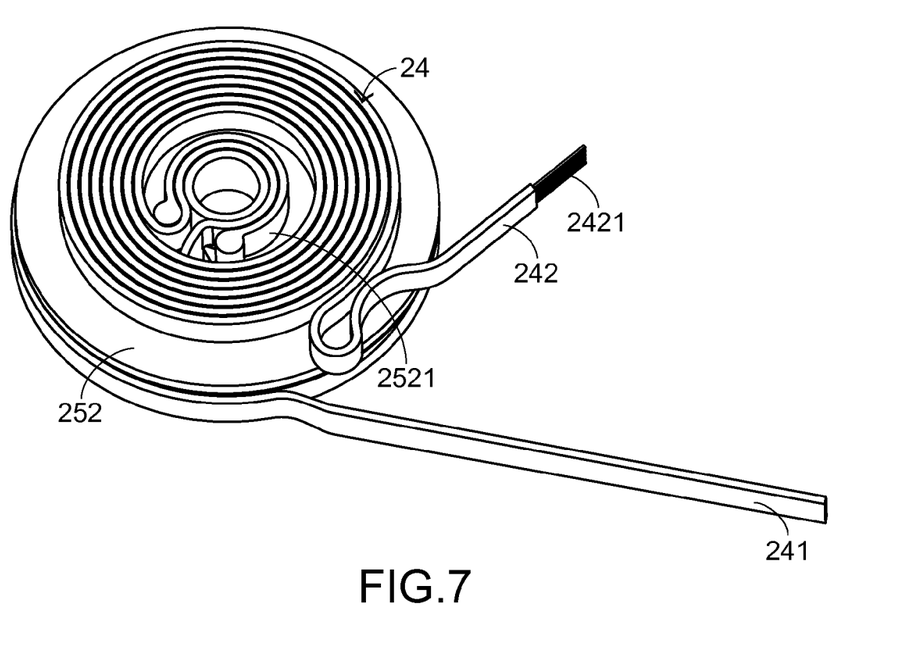
FIG. 7 is a schematic perspective view illustrating the combination of the rotating disc and the cord of FIG. 6 and taken along another viewpoint.
Figure 8:
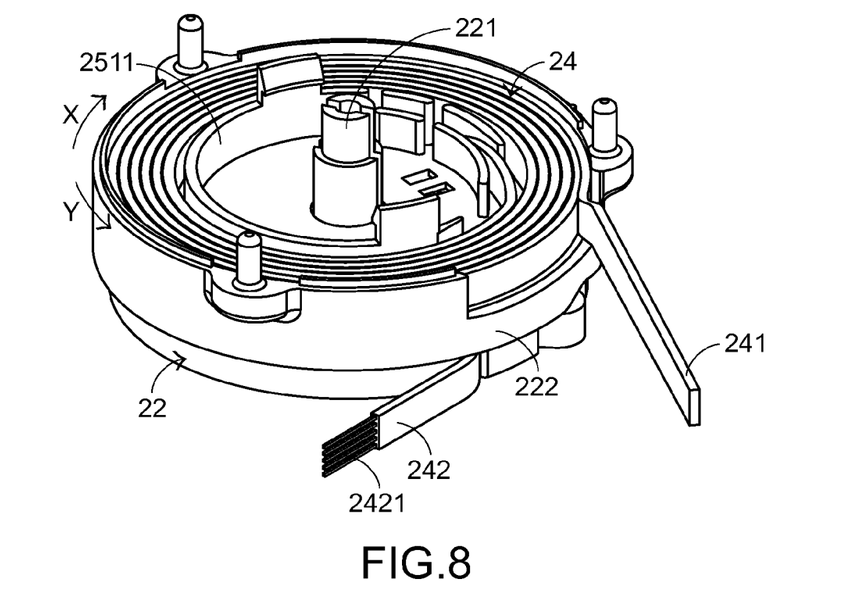
FIG. 8 is a schematic perspective view illustrating the combination of the rotating disc, the cord and the base of the cord winder according to the embodiment of the present invention.
Figure 9:
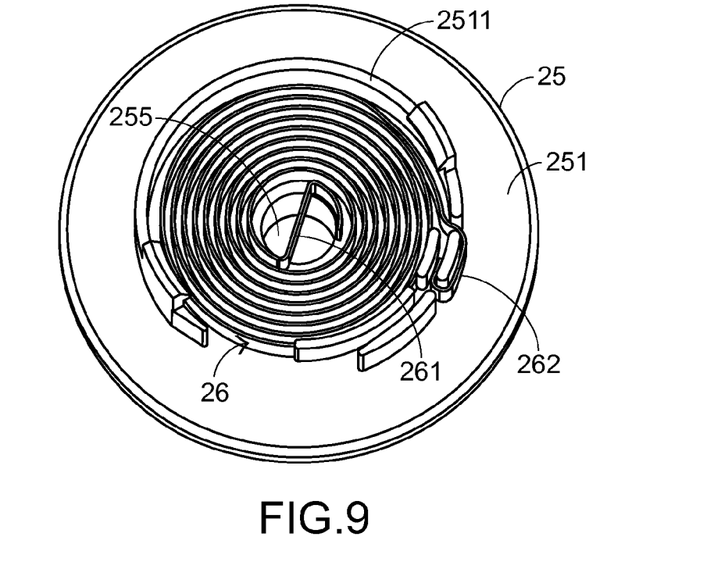
FIG. 9 is a schematic perspective view illustrating the combination of the rotating disc and the spiral spring of the cord winder according to the embodiment of the present invention.
Figure 10:
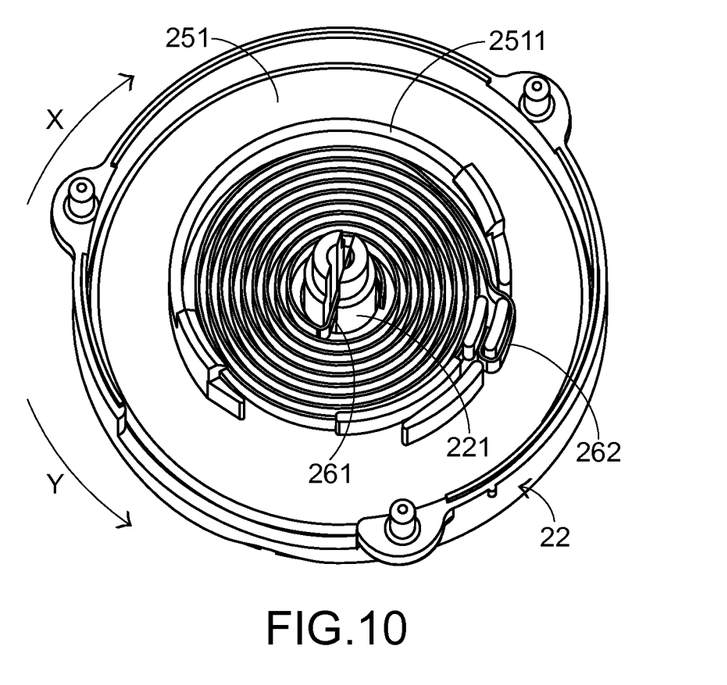
FIG. 10 is a schematic perspective view illustrating the combination of the rotating disc, the spiral spring and the base of the cord winder according to the embodiment of the present invention.
Figure 11:
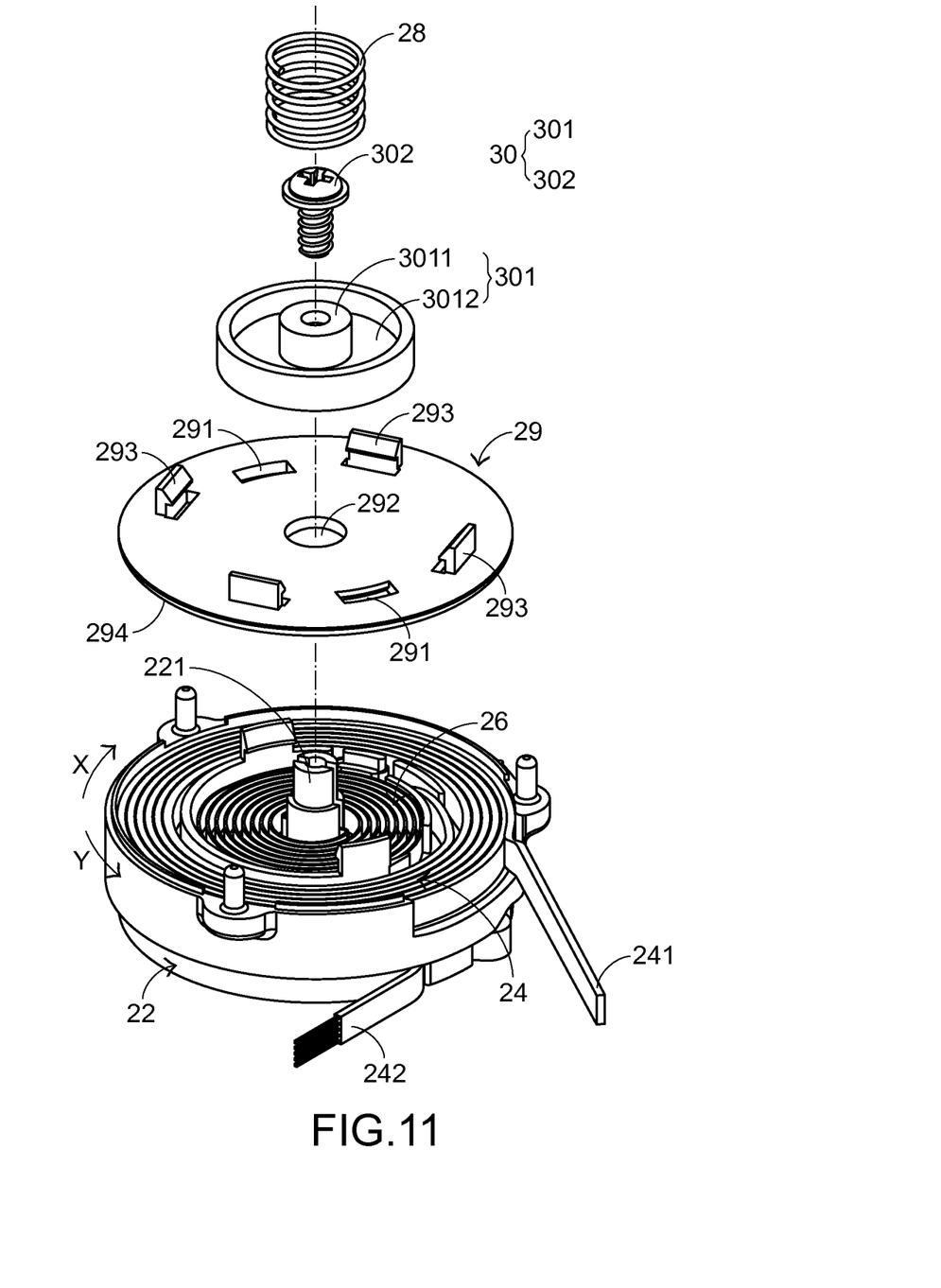
FIG. 11 is a schematic exploded view illustrating the rotating disc, the covering plate, the position-limiting mechanism and the position-restoring element of the cord winder according to the embodiment of the present invention.
Figure 12:
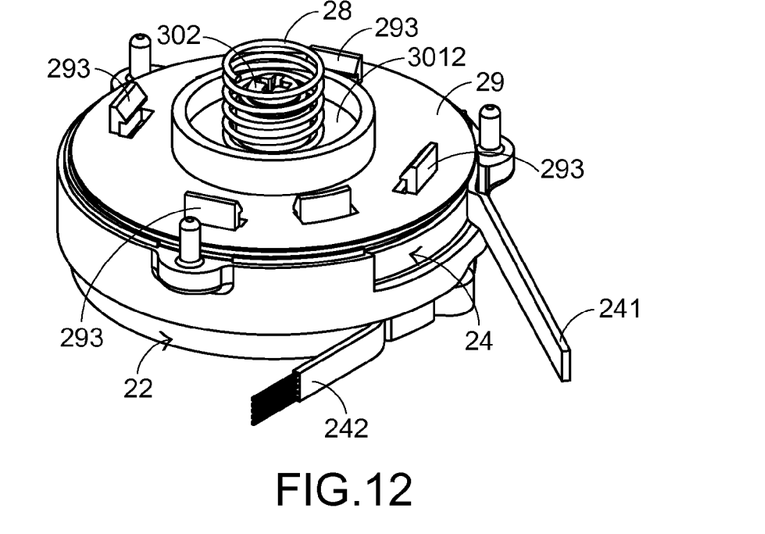
FIG. 12 is a schematic perspective view illustrating the combination of the rotating disc, the covering plate, the position-limiting mechanism and the position-restoring element of the cord winder according to the embodiment of the present invention.
Figure 13:
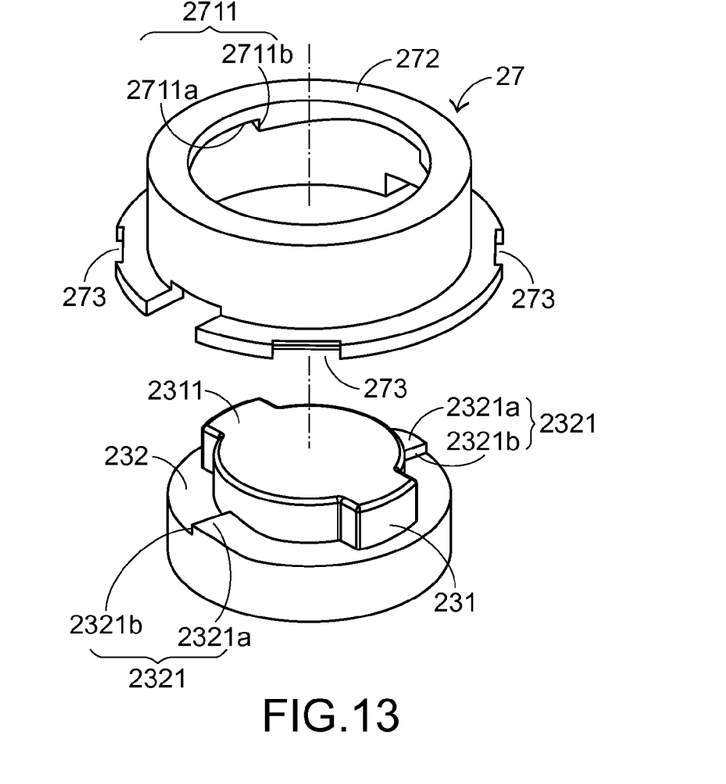
FIG. 13 is a schematic exploded view illustrating the push button and the cord positioning element of the cord winder according to the embodiment of the present invention.
Figure 14:
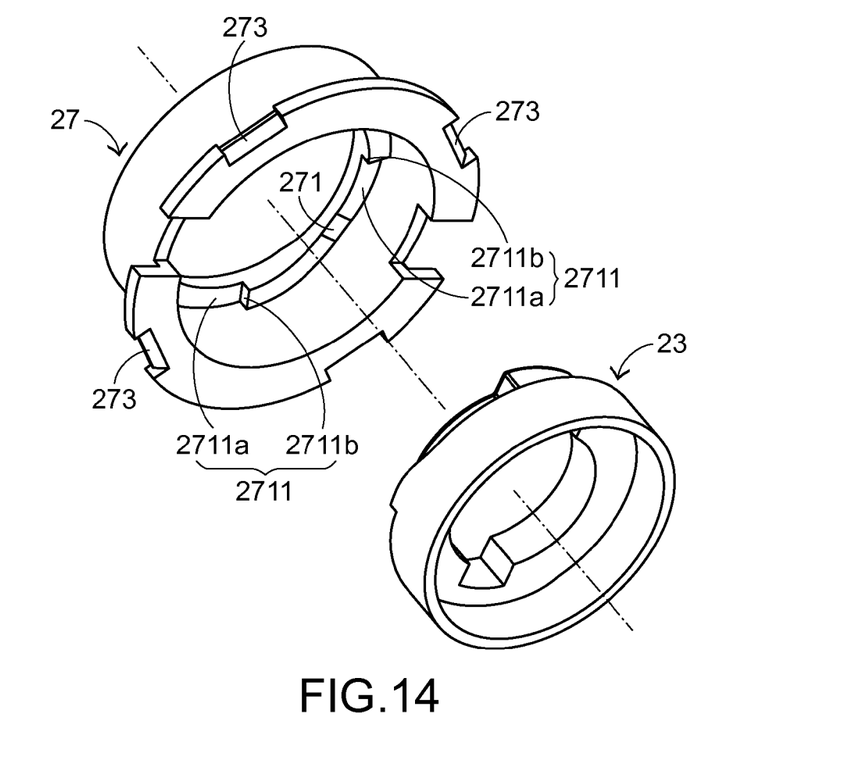
FIG. 14 is a schematic exploded view illustrating the push button and the cord positioning element of FIG. 13 and taken along another viewpoint.
Figure 15:
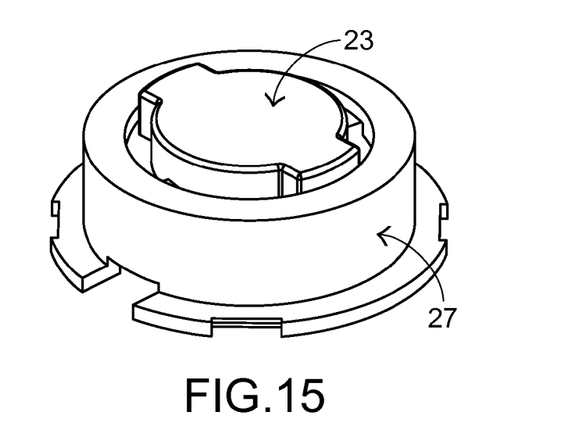
FIG. 15 is a schematic perspective view illustrating the combination of the push button and the cord positioning element of the cord winder according to the embodiment of the present invention.
Figure 16:
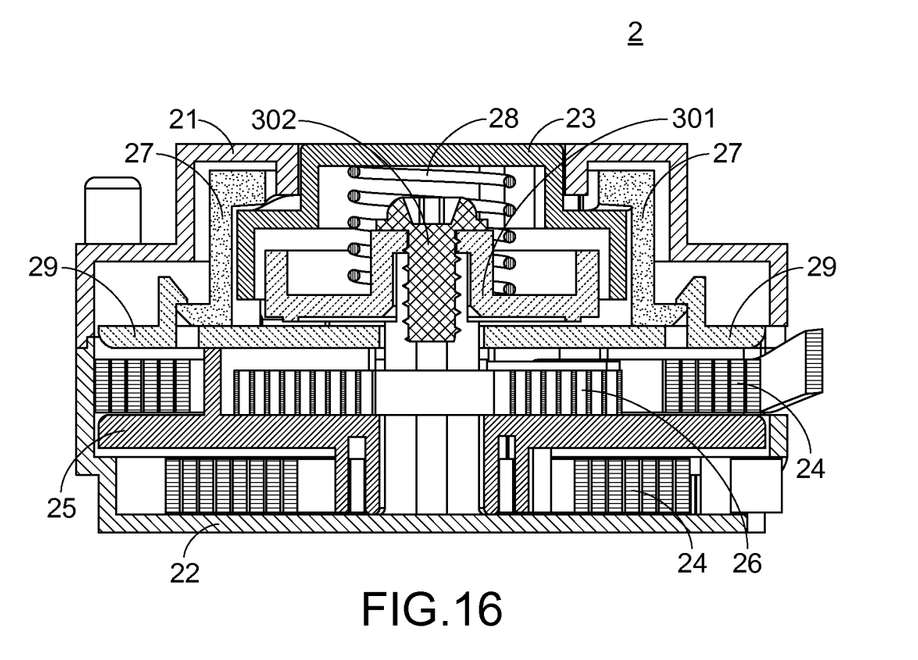
FIG. 16 is a schematic cross-sectional view illustrating the cord winder according to the embodiment of the present invention.

A process of assembling the cord winder 2 will be illustrated with reference to FIGS. 3-16. FIG. 4 is a schematic perspective view illustrating the rotating disc of the cord winder according to the embodiment of the present invention. FIG. 5 is a schematic perspective view illustrating the rotating disc of FIG. 4 and taken along another viewpoint. FIG. 6 is a schematic perspective view illustrating the combination of the rotating disc and the cord of the cord winder according to the embodiment of the present invention. FIG. 7 is a schematic perspective view illustrating the combination of the rotating disc and the cord of FIG. 6 and taken along another viewpoint. FIG. 8 is a schematic perspective view illustrating the combination of the rotating disc, the cord and the base of the cord winder according to the embodiment of the present invention. FIG. 9 is a schematic perspective view illustrating the combination of the rotating disc and the spiral spring of the cord winder according to the embodiment of the present invention. FIG. 10 is a schematic perspective view illustrating the combination of the rotating disc, the spiral spring and the base of the cord winder according to the embodiment of the present invention. FIG. 11 is a schematic exploded view illustrating the rotating disc, the covering plate, the position-limiting mechanism and the position-restoring element of the cord winder according to the embodiment of the present invention. FIG. 12 is a schematic perspective view illustrating the combination of the rotating disc, the covering plate, the position-limiting mechanism and the position-restoring element of the cord winder according to the embodiment of the present invention. FIG. 13 is a schematic exploded view illustrating the push button and the cord positioning element of the cord winder according to the embodiment of the present invention. FIG. 14 is a schematic exploded view illustrating the push button and the cord positioning element of FIG. 13 and taken along another viewpoint. FIG. 15 is a schematic perspective view illustrating the combination of the push button and the cord positioning element of the cord winder according to the embodiment of the present invention. FIG. 16 is a schematic cross-sectional view illustrating the cord winder according to the embodiment of the present invention.

First of all, the base 22 and the rotating disc 25 will be illustrated as follows. Please refer to FIG. 3, FIG. 4 and FIG. 5. The base 22 has a protruding post 221. The protruding post 221 is protruded from a middle region of the base 22. A first protruding structure 2511 is protruded from a first surface 251 of the rotating disc 25. A second protruding structure 2521 is protruded from a second surface 252 of the rotating disc 25. Moreover, a perforation 253 runs through the rotating disc 25, wherein the perforation 253 is located beside the first protruding structure 2511. The rotating disc 25 further comprises a fixing recess 254. The fixing recess 254 is formed in the second surface 252 of the rotating disc 25, and located beside the perforation 253.

For assembling the rotating disc 25 and the base 22, the rotating disc 25 is disposed within the base 22, and the protruding post 221 is penetrated through a central hole 255 of the rotating disc 25. After the protruding post 221 is penetrated through the rotating disc 25, the rotating disc 25 is freely rotatable relative to the base 22. In addition, the second surface 252 of the rotating disc 25 is closer to a bottom part of the base 22 than the first surface 251 of the rotating disc 25.

Then, a process of assembling the cord 24 and the rotating disc 25 will be illustrated as follows. Please refer to FIGS. 4-8. A portion of the cord 24 is wound around the first protruding structure 2511, which is disposed on the first surface 251 of the rotating disc 25. Moreover, the first end part 241 of the cord 24 is penetrated through a lateral opening 2221 of the base 22 (see FIG. 3) and exposed outside the base 22. Consequently, the first end part 241 of the cord 24 is feely movable. Then, the second end part 242 of the cord 24 is penetrated through the perforation 253 of the rotating disc 25. The remaining cord 24 is wound around the second protruding structure 2521, which is disposed on the second surface 252 of the rotating disc 25. Afterwards, the second end part 242 of the cord 24 is penetrated through the sidewall 222 of the base 22 and fixed on the sidewall 222 of the base 22. Consequently, the second end part 242 of the cord 24 is formed as a fixed end part.

Moreover, the portion of the cord 24 beside the perforation 253 is accommodated within the fixing recess 254, which is located beside the perforation 253. Consequently, the junction between the portion of the cord 24 wound around the first protruding structure 2511 and the portion of the cord 24 wound around the second protruding structure 2521 is in a fixed state. Under this circumstance, if the first end part 241 of the cord 24 is pulled, the second end part 242 of the cord 24 is not correspondingly pulled or influenced, and thus the single pull function is achieved Moreover, when the first end part 241 of the cord 24 is pulled by the user, the rotating disc 25 is rotated relative to the base 22 in a first direction X. Upon the rotation of the rotating disc 25, the portion of the cord 24 wound around the second protruding structure 2521 of the second surface 252 of the rotating disc 25 is gradually in a loosened status. Consequently, during the rotating disc 25 is rotated relative to the base 22, the second end part 242 of the cord 24 fixed on the sidewall 222 of the base 22 is not influenced by the rotating disc 25. On the other hand, as the rotating disc 25 is rotated relative to the base 22 in a second direction Y, the portion of the cord 24 wound around the second protruding structure 2521 of the second surface 252 of the rotating disc 25 is gradually in a tightened status.

Then, a process of assembling the spiral spring 26 and the rotating disc 25 will be illustrated as follows. Please refer to FIG. 9 and FIG. 10. The spiral spring 26 is located at an inner side of the first protruding structure 2511 of the first surface 251 of the rotating disc 25, and wound around the protruding post 221. An inner end 261 of the spiral spring 26 is fixed on the protruding post 221 of the base 22. An outer end 262 of the spiral spring 26 is fixed on the first protruding structure 2511 of the first surface 251 of the rotating disc 25.

Moreover, since the inner end 261 and the outer end 262 of the spiral spring 26 are respectively fixed on the protruding post 221 of the base 22 and the first protruding structure 2511 of the rotating disc 25 and the spiral spring 26 is wound in a specified direction, the spiral spring 26 is gradually in a tightened status when the rotating disc 25 is rotated relative to the base 22 in the first direction X, and the spiral spring 26 is gradually in a loosened status when the rotating disc 25 is rotated relative to the base 22 in the second direction Y. Consequently, if the acting force for allowing the rotating disc 25 to be rotated relative to the base 22 in the first direction X is eliminated, the rotating disc 25 is rotated relative to the base 22 in the second direction Y in response to a restoring force of the spiral spring 26.

After the cord 24, the spiral spring 26, the rotating disc 25 and the base 22 are combined together, a process of assembling the covering plate 29, the position-limiting mechanism 30 and the position-restoring element 28 will be done. A process of assembling the covering plate 29, the position-limiting mechanism 30 and the position-restoring element 28 will be illustrated with reference to FIG. 11 and FIG. 12.

Firstly, the rotating disc 25 further comprises at least one first hook part 256 (see also FIG. 4). The first hook part 256 is protruded from the first protruding structure 2511. The covering plate 29 comprises a central hole 292 and at least one first engaging part 291 beside the central hole 292. In this embodiment, the first hook part 256 is a flexible hook structure, and the first engaging part 291 is an engaging slot. The numbers of the at least one first hook part 256 and the at least one first engaging part 291 are not restricted. After the protruding post 221 of the base 22 is inserted into the central hole 292 of the covering plate 29 and penetrated through the covering plate 29 and the first hook part 256 is engaged with the first engaging part 291, the covering plate 29 is fixed on the rotating disc 25. Under this circumstance, the portion of the cord 24 wound around the first protruding structure 2511 of the rotating disc 25 and the spiral spring 26 will not be detached from the rotating disc 25.

Moreover, the position-limiting mechanism 30 comprises a position-limiting block 301 and a screw 302. The position-limiting block 301 comprises a middle part 3011 and a peripheral part 3012. In this embodiment, the middle part 3011 is a convex structure, and the peripheral part 3012 is a ring-shaped groove that is extended from the middle part 3011 and arranged around the middle part 3011. The examples of the middle part 3011 and the peripheral part 3012 are presented herein for purpose of illustration and description only. For example, in some other embodiments, the position-limiting block 301 is a planar plate or an arbitrary structure capable of achieving the same efficacy.

After the covering plate 29 is fixed on the rotating disc 25, the middle part 3011 of the position-limiting block 301 is in contact with the protruding post 221 of the base 22, and the peripheral part 3012 of the position-limiting block 301 is disposed over the covering plate 29. Then, the screw 302 is locked into the protruding post 221, so that the middle part 3011 of the position-limiting block 301 is fixed on the protruding post 221. Under this circumstance, since the peripheral part 3012 of the position-limiting block 301 fails to be moved, the covering plate 29 and the rotating disc 25 will not be detached from the protruding post 221 of the base 22.

Moreover, the position-restoring element 28 is disposed on the position-limiting block 301. In this embodiment, the position-restoring element 28 is not limited to a spring. It is noted that numerous modifications and alterations may be made while retaining the teachings of the invention. For example, in some other embodiments, the position-restoring element 28 is a foam structure for providing a restoring force. The actions of the position-restoring element 28 will be illustrated later.

After the cord 24, the spiral spring 26, the rotating disc 25, the base 22, the covering plate 29, the position-limiting mechanism 30 and the position-restoring element 28 are combined together, a process of assembling the push button 23 and the cord positioning element 27 will be done. Please refer to FIGS. 13-15.

The cord positioning element 27 is substantially a ring-shaped body. At least two notches 2711 are formed in an inner surface 271 of the cord positioning element 27. In this embodiment, four notches 2711 are formed in the inner surface 271 of the cord positioning element 27. Each of the notches 2711 comprises a first slant surface 2711a and a first stopping surface 2711b. The first slant surface 2711a and the first stopping surface 2711b intersect each other. In this embodiment, the first stopping surface 2711b is perpendicular to a top surface 272 of the cord positioning element 27.

Moreover, the push button 23 comprises a pressing part 231 and a positioning surface 232. The positioning surface 232 is arranged around the pressing part 231, and extended from the pressing part 231. The push button 23 comprises at least two protruding blocks 2321. The at least two protruding blocks 2321 are protruded from the positioning surface 232. Each of the protruding blocks 2321 comprises a second slant surface 2321a and a second stopping surface 2321b. The second slant surface 2321a and the second stopping surface 2321b intersect each other. In this embodiment, the second stopping surface 2321b b is perpendicular to a top surface 2311 of the pressing part 231.

For assembling the push button 23 and the cord positioning element 27, the push button 23 is disposed within the cord positioning element 27, and the cord positioning element 27 is fixed on the covering plate 29. Please refer to FIG. 11 and FIG. 14. The covering plate 29 comprises at least one second hook part 293. The second hook part 293 is protruded from the covering plate 29, and located beside the first engaging part 291. The cord positioning element 27 comprises at least one second engaging part 273. The second engaging part 273 is located at an outer periphery of the cord positioning element 27. In this embodiment, the second hook part 293 is a flexible hook structure, and the second engaging part 273 is an engaging recess. The numbers of the at least one second hook part 293 and the at least one second engaging part 273 are not restricted. After the second hook part 293 is engaged with the second engaging part 273, the cord positioning element 27 is fixed on the covering plate 29.

After the cord positioning element 27 is fixed on the covering plate 29, the position-restoring element 28 is arranged between the position-limiting block 301 and the push button 23. Consequently, the push button 23 is pushed and supported by the position-restoring element 28. After the pressing part 231 of the push button 23 is penetrated through the cord positioning element 27 and protruded out of the cord positioning element 27, the positioning surface 232 is contacted with the inner surface 271 of the cord positioning element 27. Under this circumstance, since the two protruding blocks 2321 are contacted with the inner surface 271 of the cord positioning element 27, the two protruding blocks 2321 and the two notches 2711 are engaged with each other to achieve the function of positioning the cord 24.

Moreover, the number of the positioning stages and the positioning distance for each turn of rotating the cord positioning element 27 may be determined according to the number of the notches 2711 in the inner surface 271 of the cord positioning element 27 and the spacing distance between every two adjacent notches 2711. For example, in this embodiment, whenever the cord positioning element 27 is rotated by 90 degrees, the positioning efficacy of the cord positioning element 27 is achieved once.

Please refer to FIG. 2, FIG. 3 and FIG. 16. After the top cover 21 is connected with the base 22, the cord winder 2 is assembled. Moreover, a hollow portion 211a is formed in the top surface 211 of the top cover 21. After the top cover 21 is connected with the base 22, the pressing part 231 of the push button 23 is penetrated through the hollow portion 211a of the top cover 21 and exposed to the top surface 211 of the top cover 21.

Moreover, the pressing part 231 of the push button 23 has a non-circular rim, and the contour of the hollow portion 211a of the top cover 21 matches the contour of the pressing part 231 of the push button 23. Consequently, after the pressing part 231 of the push button 23 is penetrated through the hollow portion 211a of the top cover 21, the push button 23 will not be rotated relative to the top cover 21.

Hereinafter, the operating principles of the cord winder 2 of the present invention will be illustrated with reference to FIG. 2, FIG. 3, FIG. 11, FIG. 13, FIG. 14 and FIG. 16.

Firstly, the first end part 241 of the cord 24 is pulled away from the base 22. Consequently, the rotating disc 25 is correspondingly driven by the cord 24 to be rotated relative to the base 22 in the first direction X. Since the covering plate 29 is fixed on the rotating disc 25, the cord positioning element 27 is correspondingly rotated with the covering plate 29 in the first direction X. Under this circumstance, the cord positioning element 27 is rotated relative to the push button 23, and the two protruding blocks 2321 of the push button 23 are moved along the inner surface 271 of the cord positioning element 27.

Moreover, when the cord positioning element 27 is rotated in the first direction X, the second slant surface 2321a of the protruding blocks 2321 is moved along the first slant surface 2711a of the notch 2711. Consequently, the cord positioning element 27 can be rotated relative to the push button 23. Moreover, as mentioned above, as the rotating disc 25 is rotated in the first direction X, the spiral spring 26 is gradually in the tightened status. Meanwhile, the portion of the cord 24 wound around the second protruding structure 2521 of the second surface 252 of the rotating disc 25 is gradually in the loosened status.

When the first end part 241 of the cord 24 is no longer pulled, the rotating disc 25, the covering plate 29 and the cord positioning element 27 are rotated relative to the base 22 in the second direction Y in response to the restoring force of the spiral spring 26. The rotating disc 25, the covering plate 29 and the cord positioning element 27 are no longer rotated relative to the base 22 until the first stopping surface 2711b of the notch 2711 of the cord positioning element 27 is contacted with the second stopping surface 2321b of the protruding block 2321 of the push button 23.

When the first stopping surface 2711b of the notch 2711 of the cord positioning element 27 is contacted with the second stopping surface 2321b of the protruding block 2321 of the push button 23, the cord positioning element 27 will not be rotated, and thus the rotation of the covering plate 29 and the rotation of the rotating disc 25 will be stopped. Under this circumstance, the exposed length of the cord 24 outside the cord winder 2 is fixed.

When the pressing part 231 of the push button 23 is pressed down in the direction toward the cord winder 2, the two protruding blocks 2321 are separated from the inner surface 271 of the cord positioning element 27. Consequently, the cord positioning element 27 is no longer stopped by the push button 23. In response to the restoring force of the spiral spring 26, the rotating disc 25 and the cord positioning element 27 are continuously rotated relative to the base 22 in the second direction Y. Consequently, the cord 24 is retracted back to the inner space of the cord winder 2. As mentioned above, when the rotating disc 25 is rotated in the second direction Y, the spiral spring 26 is gradually in the loosened status. Under this circumstance, the portion of the cord 24 wound around the second protruding structure 2521 of the second surface 252 of the rotating disc 25 is gradually in the tightened status.

When the pressing part 231 of the push button 23 is no longer pressed down, in response to a restoring force of the position-restoring element 28, the push button 23 is returned to its original position where the push button 23 is not pressed down. Under this circumstance, the first stopping surface 2711b of the notch 2711 of the cord positioning element 27 and the second stopping surface 2321b of the protruding block 2321 of the push button 23 are contacted with each other again, so that the cord positioning element 27 fails to be rotated. In this embodiment, if the push button 23 is continuously pressed down, the cord 24 can be completely retracted back at one time. Whereas, if the push button 23 is repeatedly pressed down and released, the cord 24 is gradually retracted back in several steps.

Moreover, as shown in FIG. 4 and FIG. 11, a rim 2512 of the first surface 251 of the rotating disc 25 may have rounded corners, and a rim of a bottom surface 294 of the covering plate 29 may have rounded corners. As mentioned above, after the cord 24 is wound around the rotating disc 25 and the covering plate 29 is fixed on the rotating disc 25, the portion of the cord 24 wound on the first surface 251 of the rotating disc 25 is confined between the rotating disc 25 and the covering plate 29. When the first end part 241 of the cord 24 is pulled away from the base 22 or when the cord 24 is retracted back to the inner space of the cord winder 2, the cord 24 is possibly contacted with the rim 2512 of the first surface 251 of the rotating disc 25 or the rim of the bottom surface 294 of the covering plate 29. If the corners of rim 2512 of the first surface 251 of the rotating disc 25 and the corners of the rim of the bottom surface 294 of the covering plate 29 are sharp corners, the cord 24 is readily scratched by the sharp corners. In this embodiment, since the corners of rim 2512 of the first surface 251 of the rotating disc 25 and the corners of the rim of the bottom surface 294 of the covering plate 29 are rounded corners, the possibility of scratching the cord 24 will be minimized, and the use life of the cord 24 can be prolonged.

From the above descriptions, the present invention provides the cord winder 2. By means of the push button 23 penetrated through the top cover 21, the rotating disc 25 is rotated in the second direction Y to retract the cord 24 back when the push button 23 is pressed down. Moreover, the cooperation of the protruding block 2321 of the push button 23 and the notch 2711 of the cord positioning element 27 can achieve the function of positioning the rotating disc 25.

As previously described in the prior art, the size of the push button 12 of the conventional cord winder 1 is restricted by the thickness of the top cover 11, and the size limitation may hinder the operation of the conventional cord winder 1. Moreover, in the conventional cord winder 1, the sustaining rod 122 of the push button 12 is contacted with the positioning block 143 of the rotating disc 14 to achieve the positioning function. Due to the limitation of the size of the push button 12, the sustaining rod 122 is weak and thin and thus easily damaged. According to the present invention, since the width of the top surface 211 of the top cover 21 is dependent on the width of the rotating disc 25 and the cord 24 is wound around the rotating disc 25, the width of the rotating disc 25 should be sufficiently large to wound a longer cord 24. Correspondingly, the push button 23 may have a large size. As a consequence, the cord winder 2 of the present invention is effective to overcome the above drawbacks of the conventional cord winder 1.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A cord winder, comprising:
a base comprising a protruding post;
a rotating disc disposed on said base, and comprising a perforation and a fixing recess communicated with each other, wherein said protruding post is penetrated through said rotating disc;
a spiral spring disposed on said rotating disc, and wound around said protruding post, wherein an inner end of said spiral spring is fixed on said protruding post, and an outer end of said spiral spring is fixed on said rotating disc;
a cord sequentially wound on a first surface of said rotating disc, penetrated through said perforation, fixed in said fixing recess, and wound on a second surface of said rotating disc, wherein a first end part of said cord is exposed outside said base, and a second end part of said cord is fixed on a sidewall of said base and exposed outside said base;
a cord positioning element connected with said rotating disc, wherein two notches are formed in an inner surface of said cord positioning element;
a push button comprising a pressing part and two protruding blocks, wherein said two protruding blocks are in contact with said inner surface of said cord positioning element for limiting rotation of said cord positioning element;
a position-restoring element arranged between said push button and said base for providing a restoring force to said push button;
a top cover connected with said base, and comprising a hollow portion, wherein said hollow portion is formed in a top surface of said top cover, wherein said pressing part of said push button is inserted into said hollow portion, and said push button is not rotated relative to said top cover;
a covering plate fixed on said rotating disc for preventing said cord and said spiral spring from being detached from said rotating disc, wherein said protruding post is penetrated through said covering plate and said cord positioning element is fixed on said covering plate; and
a position-limiting mechanism connected with said protruding post of said base and located near said covering plate for preventing said covering plate and said rotating disc from being detached from said protruding post of said base, wherein said position-restoring element is arranged between said position-limiting mechanism and said push button,
wherein when said first end part of said cord is pulled away from said base, said rotating disc and said cord positioning element are rotated in a first direction, and said two protruding blocks of said push button are moved along said inner surface of said cord positioning element, wherein when said first end part of said cord is no longer pulled, said two protruding blocks are respectively contacted with said two notches, so that said rotating disc and said cord positioning element are not rotated, wherein when said push button is pressed down, said two protruding blocks are separated from said inner surface of said cord positioning element, and said rotating disc and said cord positioning element are rotated in a second direction by said spiral spring, so that said cord is retracted back.

2. The cord winder according to claim 1, wherein each of said two notches comprises a first slant surface and a first stopping surface, and each of said two protruding blocks of said push button comprises a second slant surface and a second stopping surface, wherein when said cord positioning element is rotated in said first direction, said two second slant surfaces of said two protruding blocks are respectively moved along said first slant surfaces of said two notches, wherein when said cord positioning element is rotated in said second direction, said two first stopping surfaces of said two notches and said two second stopping surfaces of said two protruding blocks are respectively contacted with each other for limiting rotation of said cord positioning element.

3. The cord winder according to claim 1, wherein said cord positioning element is a ring-shaped body, and said push button further comprises a positioning surface, wherein said positioning surface is extended from said pressing part, and said two protruding blocks are protruded from said positioning surface, wherein said push button is disposed within said cord positioning element, wherein said pressing part of said push button is penetrated through said cord positioning element and then inserted into said hollow portion of said top cover.

4. The cord winder according to claim 1, wherein said rotating disc comprises a first protruding structure and a second protruding structure, wherein said first protruding structure is protruded from said first surface of said rotating disc, and said a second protruding structure is protruded from said second surface of said rotating disc, wherein said spiral spring is located at an inner side of said first protruding structure and wound around said protruding post, and said cord is wound around an outer side of said first protruding structure and said second protruding structure.

5. The cord winder according to claim 1, wherein said pressing part of said push button has a non-circular rim, and a contour of said hollow portion of said top cover matches a contour of said pressing part of said push button, so that said push button is not rotated relative to said top cover.

6. The cord winder according to claim 1, wherein an electrical connector is located at said first end part of said cord, and plural contacts are located at said second end part of said cord to be connected with a circuit board.

7. The cord winder according to claim 1, wherein said position-limiting mechanism comprises:
a position-limiting block comprising a middle part and a peripheral part, wherein said middle part is in contact with said protruding post, and said peripheral part is extended from said middle part and aligned with said covering plate; and
a screw locked into said protruding post for fixing said middle part of said position-limiting block on said protruding post.

8. The cord winder according to claim 1, wherein said rotating disc comprises a first hook part, said covering plate comprises a first engaging part and a second hook part, and said cord positioning element comprises a second engaging part, wherein said first hook part and said first engaging part are engaged with each other, and said second hook part and said second engaging part are engaged with each other.

* * * * *